United States Patent Office 3,250,607
Patented May 10, 1966

3,250,607
ANTI-HYGROSCOPIC CONDITIONING AGENT COMPRISING ILLITE
Edgar W. Sawyer, Jr., Metuchen, and Homer A. Smith and Robert W. Wert, Berkeley Heights, N.J., assignors to Minerals & Chemicals Philipp Corporation, Menlo Park, N.J., a corporation of Maryland
No Drawing. Filed Mar. 28, 1962, Ser. No. 183,032
6 Claims. (Cl. 71—64)

This invention relates to conditioning particles of hygroscopic material which normally tend to coalesce and cake during storage due to the effects of moisture, temperature and/or pressure and relates especially to a novel composition which, when applied to hygroscopic particles, especially fertilizer particles, prevents their coalescence and caking during storage.

The caking of fertilizer and other hygroscopic salts during storage presents serious difficulties to the producer and ultimate user. Fertilizer materials which cake are not amenable to usual bulk storing and handling techniques and after storage cannot be spread with mechanical distribution devices. To prevent or minimize caking of hygroscopic salts, a variety of methods has been suggested and put into practice. One of the most noteworthy has been the production of fertilizer salts in the form of regularly sized granules or prills rather than in powdered form in which there would be more sites for intercrystalline growth with resultant caking of the salt particles. While granules are generally less prone to cake than powders of the same composition, there are many types of fertilizer granules and prills, especially those high in water-soluble nitrogen, which form hard cakes when stored in moist environments. Several methods have met with success in preventing caking of a limited group of granular salts. Thus, for example, a limited group of fertilizer salts can be effectively conditioned by coating individual particles of the salt with about 2% to 5% of powdered absorptive solids such as diatomaceous earth, various clays or limestone. These conditioning agents can occasionally be used with some success in conditioning high nitrogen analysis fertilizer granules, such as ammonium nitrate prills and 10–10–10 mixed fertilizer granules, provided the granules have previously been dried to an exceptionally low moisture content, e.g., a moisture contents of say 0.1% to 0.5%. Drying fertilizer salts to a moisture content less than about 1% adversely affects the manufacturing cost of the fertilizer. Consequently, the cost involved in conditioning high nitrogen fertilizer salts with powdered sorbents is not practical. Moreover, the results frequently leave much to be desired.

One of the most promising methods for conditioning high nitrogen content fertilizer salts, especially salts which are somewhat moist, is fundamentally different in concept from the use of particulate solid sorbents. This method involves coating granules of the fertilizer salt granules with an extremely small quantity, e.g., ½ to 2 lbs./ton, of a hydrophobic fatty amine. The fatty amines appear to prevent caking by providing on the surface of the fertilizer granules a hydrophobic layer which curtails absorption of water by the granules. To accomplish this, the amine must be provided as an extremely uniform coating on the granules in order to be effective even when the amine is employed at a desirable level. To provide uniform distribution of the extremely small quantity of fatty amine conditioning agent on granules or prills of a soluble fertilizer salt, the amines are coated on the fertilizer granules by spraying a heat liquified amine or a solution of amine in organic solvent (such as oil) onto agitated fertilizer granules. These granules are usually heated while the amine is being sprayed. Since the fatty amines have very limited water solubility, the cost of drying granules coated with an aqueous solution of amine would be prohibitive. In commercial operations it is extremely difficult to insure the uniform distribution of the small quantity of amine on the fertilizer granules. Promising laboratory results have not been translated into successful commercial scale operations because of the inability to provide a sufficiently uniform coating of fatty amine or fatty amine solution on the surface of the salt particles with commercial syraying devices and material handling equipment.

Accordingly, a principal object of this invention is the provision of an improved coating agent for conditioning particles of fertilizer salts, especially water-soluble, high nitrogen analysis fertilizer salts, which avoids difficulties inherent in the use of prior art conditioning agents.

A more particular object of this invention is the provision of improved means and methods for uniformly applying a hydrophobic amine conditioning agent to fertilizer granules which are amenable to conditioning with said amine.

A more specific object of this invention is the provision of a novel powdered composition which is extremely effective when coated on particles of hygroscopic salts in preventing or curtailing caking of such particles.

A further object of this invention is the provision of a hydrophobic mineral conditioning agent which has satisfactory adhesion to fertilizer salt particles.

Another object is an improved method for conditioning hygroscopic fertilizer salts which obviates the need for spraying devices.

Still another object is the provision of improved cake-resistant fertilizer salt compositions.

Further objects and advantages will be readily apparent.

The subject invention, in essence, constitutes an improved technique for conditioning hygroscopic salts against caking with hydrophobic amines. This invention results from the discovery that the effectiveness of hydrophobic amines as anticaking agents for hygroscopic salts can be markedly improved by utilizing the unique properties of certain shale materials, hereafter described, in conjunction with the use of an oily solvent material, to apply the hydrophobic amine conditioning agents to granules of hygroscopic salt material.

State briefly, in accordance with the subject invention, an improved conditioning agent in the form of a free-flowing powder is obtained by dry coating microscopic particles of the mineral illite, or a shale containing appreciable illite, with a small amount of a solution of an aliphatic amine in an oleaginous solvent for the amine, said amine being a primary n-aliphatic monoamine having from 8 to 22 (and preferably 12 to 18) carbon atoms and containing nitrogen in trivalent state.

The coated mineral powder is dusted on the surface of hygroscopic granules or prills, especially particles of fertilizer salts high in available nitrogen. When dusted on the granules or prills, the coated mineral powder adheres tenaciously thereto. The resultant coated granules resist caking when subjected during storage to conditions of moisture and/or pressure which would normally cause the hygroscopic particles to set up into hard cakes or so-called "tombstones." While certain coated granules may form lumps when subjected to pressure and/or high humidity conditions for prolonged times, normally such lumps are friable and can be broken up merely by dropping a bag containing the material to the ground from a height of a few feet. This physical condition is considered to be satisfactory by most fertilizer users. The coated clay composition of this invention has been found to prevent caking of materials such as ammonium nitrate prills when the prills are subjected to storage conditions under which most prior art conditioners are of little or no benefit in preventing caking.

It has been found, moreover, that when a solution of fatty amine in oil is precoated on the illite, in accordance with this invention, the resultant composition is generally considerably more effective in curtailing caking of hygroscopic granules than the same quantity of amine solution would be if the solution were applied directly to the surface of the granules by spraying. In fact, in most cases the precoated illite or illitic shale will be more effective than an amine solution sprayed directly onto surface of granules in amount substantially greater than the quantity of amine solution employed in precoating the illitic mineral particles. It has been found, for example, that ammonium nitrate prills having a 1% moisture content resisted caking when conditioned with only 1 lb./ton of a mineral oil solution of mixed $C_{16}$ and $C_{18}$ fatty amines which had been precoated on illitic shale. However, caking occurred when the prills were sprayed directly with as much as 2 lbs./ton of the same solution of amine in oil. Caking of the prills also occurred when the prills were coated with hydrophobic minerals outside the scope of this invention. Thus, the presence of the illitic mineral particles with the amine and oil gives results not obtainable without the use of the illitic mineral particles. Moreover, extensive tests carried out with minerals other than illite-rich shales indicate that the beneficial results mentioned above depend upon the selection of a suitable mineral carrier for the oil solution of hydrophobic fatty amine. The following would appear to offer a logical explanation for these phenomena.

The illite employed in carrying out this invention is a material which possesses some, but very limited, sorptive capacity. This material is believed to serve principally as an agent to transfer an active conditioning chemical, namely, an oil solution of a hydrophobic amine, to the surface of particles of hygroscopic salt material. Thus, it appears that when the composition of this invention is applied to fertilizer granules, the amine solution originally present on the minute mineral particles migrates during storage onto the surfaces of the fertilizer granule in response to the action of any one or a combination of the following factors: mechanical pressure, heat and moisture. The mineral particles are extremely small as compared with granules of fertilizer salts and the mineral particles provide a strikingly larger exposed surface on a weight basis than do the larger fertilizer granules. Gradual release and transfer of amine solution from a multiplicity of sites on a plurality of individual microscopic mineral particles surrounding the fertilizer granules would appear to permit a more uniform distribution of the solution on the fertilizer granules than could be effected by spraying the amine solution directly onto the granules with commercial spraying devices. This would account for the fact that smaller quantities of amine can be employed when the amine has been precoated on the illitic mineral particles in accordance with this invention. Obviously, if the mineral particles serve as a temporary carrier or transfer agent for the amine conditioning agent, the bond between the conditioning agent and mineral particles must be for the most part an impermanent one. The affinity of the amine for the surface of the salt granule, especially a moist granule, must exceed the affinity of the amine for the mineral particles. That the transfer does occur when fertilizer salts are conditioned in accordance with this invention, is evidenced by the fact that highly absorptive minerals, such as fuller's earth, sub-bentonites and talc, all of which have a greater affinity for the oily amine solution than illite, are wholly ineffectual when substituted for the illite or illitic shale. The coated mineral compositions of this invention have a strong tendency to spread on the surface of a saturated ammonium nitrate solution while a variety of other organophilic clays, including onium clays, do not possess this property. This indicates that the coating is released from the illite particles when the coated illite particles are applied to ammonium nitrate. The apparent necessity for the use of oily solvent in conjunction with the amine may be explained by the role of the oil in maintaining the amine in liquified transferable condition and also in curtailing undesirable chemical or physical affixation of the amine to the illite, as by ion-exchange.

It is believed, however, that the illite or illitic shale does not function solely as a carrier for an active conditioning chemical. Experience indicates that even after active conditioning chemical has been transferred from the illite to the fertilizer granules, the residual illite will be hydrophobic and, therefore, probably contribute somewhat to preventing caking by providing a water-repellent barrier around the amine coated fertilizer granules.

From this brief description of the mineral conditioning agent of this invention and its probable mode of operation, it will be readily apparent that the nature and function of the conditioning agent are completely unrelated to the nature and function of prior art conditioning agents consisting of inorganic absorbent powders, such as fuller's earth, diatomaceous earth, bentonite and various shales. In fact, it will be shown hereafter that certain minerals which have met fairly widespread use as conditioners for hygroscopic salts in their naturally occuring state are completely ineffectual as conditioning agents when coated, in accordance with this invention, with an oil solution of fatty amine. It will also be readily apparent that the amine coated mineral conditioning agent of this invention differs fundamentally in nature from onium clay reacted clay conditioning agents of the prior art, as described in U.S. 2,702,747 to Studebaker. The prior art onium clays are obtained by chemically reacting a clay having high base-exchange capacity, such as Wyoming bentonite, illite or attapulgite, with a long chain amine containing nitrogen in pentavalent state to form a hydrophobic amine bentonite complex in which the amine cation is an integral part of the clay lattice. The reaction between clay and amine containing pentavalent nitrogen to form an onium clay is carried out in an aqueous reaction medium in which the onium clay reaction product precipitates out and is then filtered. In contrast, the dry coated mineral material of this invention contains amine in trivalent state and the amine, previously dissolved in oil, is only loosely held by the shale particles by a temporary physical bond. It will be shown hereafter that onium clays are extremely poor conditioning agents as compared with the coated mineral product of this invention and, further, that the adhesion of onium clays to fertilizer granules is poor as compared with the adhesion of the coated mineral particles made in accordance with this invention. Likewise, the conditioning agent of this invention differs in principle and nature from other prior conditioning agents in the form of hydrophobic particulate matter, such as the wax or oil coated natural mineral dusts described in U.S. 2,523,420 to Burrage. The latter, like onium clays, merely provide a hydrophobic surface coating on hygroscopic particles to which they are applied. The hydrophobic materials employed in coating the mineral particles are not surface active and they do not set and spread on the surface of the salt particles being conditioned, as do the coating materials employed in carrying out this invention.

We are also aware that it has been suggested in U.S. 2,539,012 to Diamond to use any one of several types of inorganic filler particles coated with hydrophobic amines or other surfactants for conditioning sodium chloride. These particles are used in conjunction with magnesium stearate which is applied directly onto the surface of the salt particles. The filler particles merely perform their usual function which is to improve the ease with which the salt particles flow. It is the magnesium stearate which is coated directly on the salt particles that functions to prevent caking of the salt particles. The amine or equivalent nonionic or anionic surfactant present on the filler particles serves merely as an ingredient to prevent the formation of a magnesium stearate scum by dispersing the stearate soap when the coated sodium chloride is dissolved in water. In other words, the only function of the surfactant is to disperse an insoluble soap that is employed as the active conditioning agent. No oily solvent is employed with the amine or other surfactant, and the amine or other surfactant is not transferred to the salt particles during storage.

In putting the instant invention into practice, the total quantity of amine solution applied to the mineral does not exceed about 10% of the dry mineral weight (determined by heating the mineral to constant weight at about 220° F.). When the coating agent is used in greater amount, the free-flowing property of the mineral dust is impaired and the coated material cannot be uniformly disseminated on the particles of fertilizer salts. The coating agent loses much of its effectiveness when used in amount less than about 1% of the weight of the mineral. Preferred is the use of coating agent in amount within the range of about 2% to 8% of the mineral weight, with the range of about 3% to 6% being especially preferred for economic reasons. The proportions of amine to oily solvent in the coating agent is usually within the range of 15 to 85 parts by weight of amine to 85 to 15 parts by weight of oily solvent, preferably from about 30 to 60 parts amine to about 70 to 40 parts oil. The oily solvent is preferably employed in amount sufficient to maintain the amine in liquid condition at ambient temperature (e.g., 70° F.). The optimum quantity of oil will vary with the amine and nature of the oily solvent.

It is also within the scope of this invention to incorporate an extremely small quantity of an oil-compatible noncationic surface active agent into the oily amine coating solution before adding the solution to the mineral particles. The noncationic surface active agent is incorporated into the solution before the solution is applied to the mineral particles for the purpose of improving the ease of coating the solution onto the mineral particles and to improve the rate of spreading of the oil-amine solution on the surface of the material to be conditioned. The use of such material is optional only and excellent results can be expected without employing the surfactant. When certain nonionic surfactants, such as condensation products of ethylene oxide with fatty acids, are employed, they also produce the desirable result of reducing the amount of fumes produced by the amines when they are coated on the mineral particles. The nonionic surfactant can be used in amount of about 0% to 15% of the weight of the amine, and if used, is preferably employed in amount within the range of about 1% to 3% of the weight of the amine.

A substantially pure illite can be used in carrying out this invention when such material is available. Illite is a hydrated potassium aluminum silicate mineral with a 10-A. "c"-axis spacing which shows substantially no expanding lattice characteristics. Illite minerals and their properties are described at pages 20–22 in a text by Ralph E. Grim, entitled, "Applied Clay Mineralogy," published by McGraw-Hill Book Company, Inc. (1962). For economic reasons, it is preferred to employ an impure form of an illite, namely, a shale containing an appreciable quantity of illite, i.e., an "illitic shale." The earthy material called "grundite" is an example of an illitic shale. Many shales, but not all shales, contain illite, and only those shales which contain significant quantities of illite (e.g., at least about 20% by weight) are suitable. Typical illitic shales analyze (ignited basis) from 54 to 70% by weight $SiO_2$, 16 to 25% $Al_2O_3$, 3 to to 6% $K_2O$, 1 to 10% $Fe_2O_3$, 0.5 to 5% FeO, and small quantities of MgO, CaO and $Na_2O$. Illitic shales usually contain from 20% to 70% by weight of illite and also contain one or more of the following minerals: quartz, kaolinite and chlorite. In some shales limonite, calcite and gypsum are also present. Suitable shales are mined in Illinois in Hancock County, Knox County and Grundy County, although illitic shales from other sources can also be employed. The clay mineral kaolinite has also been found to be an excellent carrier for an oil solution of fatty amines. Therefore, the presence of kaolinite with illite should not be deleterious and shales which have only a modest illite content but are relatively rich in kaolinite should produce results as good as results obtained with pure forms of illite.

The illitic shale is preferably degritted hydraulically or by air classification to remove plus 325 mesh (Tyler) grit and nondispersible aggregates.

In producing the coated mineral conditioning agent of this invention, the dry illite or illitic shale can merely be dry blended at room temperature with a solution of an amine in oil in a blending mill and the mixture pulverized. The preferred method is to drip the amine solution, heat liquified when necessary, onto the dry mineral in a blending device, agitate the ingredients and mill the ingredients to obtain a product which is substantially (e.g., at least about 98% by weight) minus 325 mesh (44 microns). In practice, this may be done by metering the liquid amine solution into a screen mill into which mineral is metered and blend the ingredients in the mill using, for example, a 0.027-inch screen. It may be advantageous to heat the amine solution even when the solution is normally a liquid to decrease the viscosity of the solution and thereby facilitate spreading of the solution on the mineral particles. It is also desirable to heat the mineral before incorporation of the amine solution and the mineral temperature should be somewhat higher than the temperature of the solution that is applied to the mineral. Good results in uniformly coating the mineral particles can be brought about using the above techniques without using spraying equipment.

The free moisture content of the coated mineral product should be from 0% to about 1% by weight.

Pure aliphatic amines of the formula $RNH_2$ (wherein R is an aliphatic radical containing 8 to 22 carbon atoms) can be used singly or in combination in carrying out this invention, and the aliphatic radical of the amines can be saturated or unsaturated. Representative pure amines include octylamine, decylamine, decenylamine, octadecylamine and octadecenylamine. Preferred amines are commercial mixtures obtained from hydrolysis of animal and vegetable oils, such as coconut oil, soybean oil, tallow or cottonseed oil, followed by ammonolysis, dehydration and hydrogenation. The resultant amines consist predominately of mixtures of saturated and unsaturated primary n-aliphatic amines containing from 12 to 18 carbon atoms, depending upon the oil that is employed as a starting material. At present it is believed that optimum conditioning of high nitrogen analysis mixed fertilizer granules and $NH_4NO_3$ prills is obtained with n-aliphatic primary amines in which the aliphatic groups consist for the most part of a mixture of $C_{16}$ and $C_{18}$ hydrocarbons, e.g., amines from soybean oil and tallow.

Examples of suitable oily solvents that are useful in making up the amine coating solution are hydrocarbons, such as, for example, mineral oil, and fatty nitriles which are obtained by ammonolysis and dehydration of fatty acids from vegetable and animal oils of the type described above.

As mentioned, a noncationic (i.e., nonionic or anionic) surface active agent is optionally dissolved in the oil. As examples of suitable nonionic agents may be mentioned: condensation products of fatty acids with ethylene oxides having fatty chains of 12 to 18 carbon atoms and polyethylene oxide chains of 220 to 2200 molecular weight; condensation products of primary n-aliphatic amines with ethylene oxide having fatty chains of 12 to 18 carbon atoms and polyethylene oxide chains of 220 to 2200 molecular weight. Mahogany sulfonates are representative of oil-compatible anionic surface active agents.

The coated illite conditioning agent is useful in conditioning granular and semigranular particles of hygroscopic mixed fertilizer salts or hygroscopic fertilizer salt. The conditioning agent is especially useful in preventing caking of very soluble high nitrogen analysis fertilizer salts, e.g., ammonium nitrate and 10-10-10, 12-0-12 and 14-0-14 mixed fertilizer grades. The conditioning agent should also be effective in preventing caking of urea granules. An additional advantage of the conditioning agent is that it will not sensitize ammonium nitrate, as will many organic materials, and therefore will not cause the nitrate to detonate by accident. Optimum benefits of this invention are realized in conditioning soluble high nitrogen analysis salts which have a free moisture content in excess of about 0.5%, inasmuch as it is extremely difficult to prevent caking of these materials with known anticaking agents. The term "free moisture" or "F.M." refers to the weight percentage of a material that is eliminated by heating the material to essentially constant weight at 220° F.

To condition fertilizer granules with the coated illite conditioning agent, the granules are dry tumbled with a suitable quantity of mineral which has been previously coated with an oily amine solution for a time sufficient for a uniform layer of the precoated mineral particles to accumulate on surfaces of the granules. Tumbling may be at room temperature although it is preferable to preheat the granules to a temperature below their melting point or, in the case of ammonium nitrate, to a temperature below the transition point of the salt. A rotary dryer or rotary cooler is satisfactory for applying the conditioning agent. A convenient point in the fertilizer manufacturing process to apply the conditioning agent is immediately after the granulating step, before cooling and screening.

The coated mineral particles are used in amounts within the range of about 5 to about 40 lbs./ton of fertilizer granules, and usually in amount within the range of 10 to 30 lbs./ton. When employed in amount less than about 10 lbs./ton, the agent may lose some of its effectiveness and may not provide adequate cake resistance for most applications. On the other hand, use of more than about 30 lbs./ton of the coated mineral may be prohibitive from an economic standpoint. Excellent results have been realized using the coated mineral of this invention in amount such as to incorporate only 0.3 pound of amine per ton of ammonium nitrate prills, e.g., 20 lbs./ton of coated mineral particles containing amine in amount of 1½% by weight. The optimum quantity of conditioning agent will vary with the nature of the fertilizer granules and the particle size of the granules as well as with the extent of anticaking that is required of the conditioned granules.

It is also within the scope of this invention to further treat the conditioned fertilizer particles with an additional powdered mineral agent to improve the ease of flow of the conditioned fertilizer particles, since the coated mineral particles of this invention function principally as an anticaking agent and do not improve to an appreciable extent the ease of flow of the fertilizer particles (as measured by the angle repose of poured granules). Thus, after initially dusting fertilizer granules with illite containing sorbed oily amine solution, in accordance with this invention, a material which is effective in improving the ease of flow of the precoated granules, such as calcined attapulgite clay, is then dusted on the granules.

The following examples are given to contribute to a fuller understanding of the present invention and to demonstrate the superiority of the novel organophilic mineral conditioning agent of this invention over a variety of prior art conditioning agents.

PREPARATION OF COATED MINERAL SAMPLES

In coating minerals with oil solutions of fatty amine, the following procedure was used. A previously formed amine solution was heated to about 220° F. and the warm solution was slowly metered onto milled mineral particles in a screen mill using a screen having 0.027-inch openings. Following are formulations of normally liquid (i.e., at 70° F.) coating formulations employed.

MINERAL COATING COMPOSITIONS

| Ingredients | Weight, percent |
| --- | --- |
| FORMULATION A | |
| Fatty Amine Mixture #1: Mixed n-aliphatic primary monoamines consisting predominantly of unsaturated $C^{18}$ amines and also containing $C^{16}$ amines | 40 |
| Mineral oil | 59 |
| Nonionic surfactant [1] | 1 |
| FORMULATION B | |
| Fatty Amine Mixture #2: Consisting of about 2% tetradecylamine, 24% hexadecylamine, 71% octadecylamine and 3% octadecadienylamine | 30 |
| Mineral oil | 69 |
| Nonionic surfactant [1] | 1 |

[1] Condensation product of about 10 mols ethylene oxide with 1 mol of a mixture of fatty acids containing 50% oleic acid, 40% linoleic acid, 5% linolenic acid and 5% rosin acids.

CONDITIONING OF FERTILIZERS

All granular fertilizers were conditioned with organophilic minerals and mineral dusts by agitating conditioning agent with granules in a rotating drum at room temperature. In coating granules directly with amine conditioner, amine solution was sprayed onto agitated granules at about 250° F. in a rotary dryer.

DESCRIPTION OF TESTS CARRIED OUT WITH CONDITIONING AGENTS

Percent adhesion—100 g. sample of prills coated with conditioner are placed on 60 mesh (Tyler series) screen and gently hand shaken for 30 seconds. The T/60 dust is collected, dried and weighed and reported as % of the conditioner used.

Caking (lever caking tester)—A 125 cc. sample with an adjusted F.M. of 1.0% is placed in a sealed paper bag and the bag placed under a pressure of 60 lbs./in.$^2$ for for 7 days. During the 7 days, the samples in the press are heated to 90° F. for 8 hours and cooled to 75° F. for 16 hours to pass the prills through the $NH_4NO_3$ transition point.

Sample ratings are as follows:
 a—flowable
 b—few friable lumps
 c—few hard lumps
 d—mostly hard lumps
 e—hard cake
 f—very hard cake A rating of "c" in this test is considered to be indicative of an acceptable conditioner.

Example I

Experiments were carried out to demonstrate that, of a wide variety of silicate minerals and other finely divided minerals sugguested in the prior art as conditioning agents or agents to improve the ease of flow of granular fertilizer salts, only an illitic shale and kaolinite were suitable as the solid carrier ingredient in compositions of this invention.

The sample of illitic shale employed in this example was mined in Hancock County, Illinois, and corresponds to Sample No. 1408 in a pamphlet by W. Arthur White entitled, "Lightweight Aggregate From Illinois Shales," Division of the Illinois State Geological Survey, Urbana, Illinois (Circular 290, 1960). The shale sample is reported to contain about 40% by weight of illite, about 40% chlorite, about 10% kaolinite and less than 10% quartz. Following is a chemical analysis of the Hancock County shale:

| | |
|---|---|
| $SiO_2$ | 55.10 |
| $Al_2O_3$ | 21.25 |
| $Fe_2O_3$ | 6.97 |
| FeO | 2.96 |
| MgO | 2.03 |
| CaO | 0.24 |
| $Na_2O K_2O$ | 4.67 |
| L.O.I. | 6.85 |
| | 100.07 |

Samples of various minus 325 mesh minerals were coated with 5% by weight of each of coating formulations A and B, the compositions of which are described above. Samples of coated minerals were applied to ammonium nitrate prills in amount of 1% (20 lbs./ton of prills). The free moisture of all coated prills was adjusted to 1% before testing for caking in the lever caking tester. Results are summarized in Table I.

Data in Table I show that the various common mineral dusts investigated, including a variety of silicate minerals, only the illitic shale and kaolinite coated with the oil solutions of aliphatic amine (Samples Nos. 1 to 4) effectively conditioned the ammonium nitrate prills at a 1% moisture level. Other silicate minerals tested as a carrier for the oil solutions of fatty amines, including a nonillitic shale, were very ineffective as compared with the illitic shale and the kaolinite.

Example II

Experiments were carried out to compare the effectiveness of the coated illitic shales of this invention (Samples Nos. 1 and 2) as conditioning agents for ammonium nitrate prills with prior art clay conditioners including uncoated kaolin clay, activated Georgia-Florida fuller's earth (attapulgite clay), commercial onium bentonites and commercial organophilic kaolin clays. All coated minerals were employed in amount of 20 lbs./ton of prills.

Results in Table II show that none of the naturally occurring clays and prior art organophilic clays was an effective anticaking agent for the ammonium nitrate prills and that only coated illitic shale of this invention effectively conditioned the $NH_4NO_3$ prills. Thus, organophilic kaolin clays outside the scope of this invention, such as Sample No. 24 (clay coated with octylamine acetate with no oily solvent) and Sample No. 25 (kaolin coated with rosin amine stearate) were comparatively ineffectual, rating "e" and "d," respectively. The data show also the marked superiority of coated clays of this invention, which rated "a" over onium clay conditioners of the prior art (Samples Nos. 27 to 29), all of which rated "d" or "f." Of the various organophilic conditioners, only kaolin coated with magnesium stearate (Sample No. 26) matched the excellent adhesion properties of coated illitic shale. However, Sample No. 26 did not prevent or significantly restrict caking, as evidenced by its rating of "e." The data show that the adhesion of onium clays (Samples Nos. 27 to 29) was extremely poor as compared with the amine-oil coated illitic shale of this invention.

Conditioners of this invention containing 1 lb./ton of amine solution in oil (Formulations A and B) precoated on illitic shale were compared with 1 to 2 lbs./ton of the same solutions applied directly to ammonium nitrate prills. All conditioned prills were evaluated at a 1% moisture level. It was found that, while 1 lb./ton of solution was effective when precoated on shale at the 5% level, 1 lb./ton of solution sprayed directly on prills was ineffective and the prills caked.

TABLE I.—EFFECT OF MINERAL CARRIERS FOR AMINE-OIL SOLUTIONS ON CONDITIONING OF $NH_4NO_3$ PRILLS (1% MOISTURE CONTENT—20# COATED MINERAL/TON PRILLS)

| Conditioner Sample No. | Conditioner composition | | | | Caking test* | |
|---|---|---|---|---|---|---|
| | Mineral carrier | Wt. percent | Amine-oil formulation | Wt. percent | Results | Rating |
| 1 | Illitic shale | 95 | A | 5 | Flowable | a. |
| 2 | ----do---- | 95 | B | 5 | ----do---- | a. |
| 3 | ASP 400 [1] | 95 | A | 5 | ----do---- | a. |
| 4 | ASP 400 [1] | 95 | B | 5 | ----do---- | a. |
| 5 | New Jersey shale (no illite) | 95 | A | 5 | Very hard cake | f. |
| 6 | ----do---- | 95 | B | 5 | ----do---- | f. |
| 7 | Calcined fluid energy milled attapulgite clay. | 95 | A | 5 | Hard cake | e. |
| 8 | ----do---- | 95 | B | 5 | ----do---- | e. |
| 9 | Sepiolite clay | 95 | A | 5 | ----do---- | e. |
| 10 | ----do---- | 95 | B | 5 | ----do---- | e. |
| 11 | Pyrophyllite | 95 | A | 5 | Hard lumps | d. |
| 12 | ----do---- | 95 | B | 5 | ----do---- | d. |
| 13 | Gypsum | 95 | A | 5 | Very hard cake | f. |
| 14 | ----do---- | 95 | B | 5 | ----do---- | f. |
| 15 | Southern (nonswelling) bentonite. | 95 | A | 5 | ----do---- | f. |
| 16 | ----do---- | 95 | B | 5 | Hard cake | e. |
| 17 | Limestone | 95 | A | 5 | ----do---- | e. |
| 18 | ----do---- | 95 | B | 5 | ----do---- | e. |
| 19 | None | | | | Very hard cake | f. |

[1] A coarse size fraction of degritted Georgia kaolin clay (kaolinite).
*Caking test run in lever caking tester; F.M. adjusted to 1% before testing for caking.

TABLE II.—EFFECT OF CONDITIONING AGENTS ON ADHESION AND CAKING OF $NH_4NO_3$ PRILLS (1% MOISTURE CONTENT) 20# CONDITIONER/TON PRILLS

| Conditioner Sample No. | Conditioner composition | Percent adhesion (all samples at about 0.50% F.M.) | Caking results* | Rating |
|---|---|---|---|---|
| | Clay compositions of subject invention: | | | |
| 1 | 95% Illitic shale plus 5% Formulation A | 92 | Flowable | a. |
| 2 | 95% Illitic shale plus 5% Formulation B | 91 | do | a. |
| | Uncoated minerals: | | | |
| 20 | ASP 400 | 94 | Very hard cake | f. |
| 21 | Activated Attapulgite [1] | 75 | do | f. |
| 22 | do [2] | 74 | do | f. |
| 23 | do [3] | 42 | do | f. |
| | Organophilic minerals outside scope of subject invention: | | | |
| 24 | 98% ASP 400 dry coated with 2% octylamine acetate. | 73 | Hard cake | e. |
| 25 | 98% ASP 400 dry coated with 2% rosin amine D stearate. | 79 | Many hard lumps | d. |
| 26 | 99% 0.5 micron kaolinite dry coated with 1% magnesium stearate. | 90 | Hard cake | e. |
| 27 | Bentone 18 [4] | 44 | Very hard cake | f. |
| 28 | Bentone 27 [5] | 44 | do | f. |
| 29 | Bentone 34 [6] | 42 | Hard lumps | d. |

[1] Average equivalent spherical diameter, about 2 microns.
[2] Average equivalent spherical diameter, about 4 microns.
[3] Average equivalent spherical diameter, about 15 microns.
[4] Octadecylammonium bentonite.
[5] Heptadodecylammonium bentonite.
[6] Dimethyldioctadecylammonium bentonite.
*Caking test run in lever caking tester; F.M. adjusted to 1% before testing for caking.

We claim:
1. Illite particles coated with from about 1% to 10% by weight of a solution of 15 to 85 parts by weight of an n-aliphatic primary amine in 85 to 15 parts by weight of an inert oily solvent for said amine by mixing dry illite particles with said solution, said amine having the formula $RNH_2$, wherein R is an n-aliphatic radical containing 8 to 22 carbon atoms and said oily solvent being selected from the group consisting of a hydrocarbon oil and a fatty nitrile containing from 12 to 18 carbon atoms, said coated illite particles being in the form of a free-flowing powder.

2. The composition of claim 1 wherein said illite is in the form of illitic shale.

3. The composition of claim 2 wherein the particles of said illitic shale are coated with from about 2% to 8% by weight of said amine and said oily solvent and said amine comprises a mixture predominantly of amines having 16 and 18 carbon atoms.

4. The composition of claim 2 wherein said solvent is mineral oil.

5. The composition of claim 2 wherein said amine is present in amount of 30 to 60 parts by weight to 70 to 40 parts by weight of said oily solvent.

6. In the conditioning of hygroscopic salt particles against caking with an oil solution of a primary n-aliphatic amine having 8 to 22 carbon atoms, the improvement which consists in coating the surface of said hygroscopic salt particles with a small amount of the composition of claim 1.

References Cited by the Examiner
UNITED STATES PATENTS

| | | | |
|---|---|---|---|
| 2,320,009 | 5/1943 | Ralston et al. | 106—72 |
| 2,531,396 | 11/1950 | Carter et al. | 106—72 |
| 2,535,647 | 12/1950 | Millman et al. | 106—72 |
| 2,690,389 | 9/1954 | Studebaker | 71—64 |
| 2,702,747 | 2/1955 | Studebaker | 71—64 |
| 2,761,835 | 9/1956 | Brown | 106—72 |
| 2,797,196 | 6/1957 | Dunn et al. | 252—8 |
| 2,815,292 | 12/1957 | Thiele | 106—72 |
| 2,948,632 | 8/1960 | Albert et al. | 106—72 |
| 2,982,665 | 5/1961 | Wilcox | 106—308 |
| 3,034,858 | 5/1962 | Vives | 71—64 |
| 3,041,159 | 6/1962 | Smith | 71—64 |
| 3,050,385 | 8/1962 | Parker | 71—64 |
| 3,186,828 | 6/1965 | Bearson | 23—103 |

DONALL H. SYLVESTER, *Primary Examiner.*

ANTHONY SCIAMANNA, *Examiner.*

T. D. KILEY, *Assistant Examiner.*